United States Patent [19]

Okamura

[11] Patent Number: 4,688,905

[45] Date of Patent: Aug. 25, 1987

[54] VIEWER

[76] Inventor: Makoto Okamura, 1567-4, Sakata, Okegawa-shi, Saitama-ken, Japan

[21] Appl. No.: 719,801

[22] Filed: Apr. 4, 1985

[30] Foreign Application Priority Data

Apr. 6, 1984 [JP] Japan ................................. 59-67475

[51] Int. Cl.⁴ ........................... G02B 3/08; G02B 5/04; G02B 25/04
[52] U.S. Cl. .................................. 350/452; 350/540; 350/541
[58] Field of Search ......................... 350/452, 578–580, 350/540, 541, 539

[56] References Cited

U.S. PATENT DOCUMENTS 4,260,217  4/1981  Traeger et al. ...................... 350/541
4,274,714  6/1981  Okamura .............................. 350/452
4,573,773  8/1986  Arndt et al. .......................... 350/540

*Primary Examiner*—John K. Corbin
*Assistant Examiner*—Rebecca D. Gass
*Attorney, Agent, or Firm*—Steinberg & Raskin

[57] ABSTRACT

In a viewer for vehicles, machines, apparatus and other various equipments, including an optical element, which is capable of viewing a certain range of visual field through an opening of a case by using the optical element, at least two openings are formed in the case and a mirror arranged therein is capable of being in or out of the visual field including at least the two openings, thereby changing the visual field. A Fresnel concave lens with or without a refractive prism attached thereon is put in each opening. The optical element comprises the Fresnel concave lens, the refractive prism and the mirror.

20 Claims, 8 Drawing Figures

VIEWER

BACKGROUND OF THE INVENTION

This invention relates to a viewer, and more particularly relates to a viewer including an optical element, for viewing a certain range of the circumference of a vehicle, an apparatus, a machine and other various equipments, and inside and outside of a factory.

Generally, in a constructional machine, an agricultural machine, a transport machine or other various machines, when such a machine is moved or operated by a man, in most cases, there is a dead angle for the operator. Further, in immovable constructions or the like, a fence or other obstacles often obstruct the way and hence there is the dead angle. Thus, in this case, sufficient observations can not be conducted mostly. In such a case, formerly, the viewing is carried out by using a convex mirror, a set of television camera and receiver, a radiodetector, or the like. However, with respect to their abilities, using conditions, costs, and so forth, the satisfactory results can not be obtained, as disclosed, in detail, in the U.S. Pat. No. 4,274,714, Makoto OKAMURA, and the U.S. Ser. No. 355,489 filed Mar. 8, 1982 (allowed Aug. 20, 1984) by Makoto OKAMURA, the same Inventor and Applicant as the present Inventor and Applicant.

That is, concerning the convex mirror, the view range is small, and the reflected image is largely distorted as well as upside-down. Further, it is liable to receive external influences such as rain and dust. As to the set of television camera and receiver, it costs high and the stable electric power is always required. Further, its installation is difficult and the frequency in happening troubles is high. In a fixed-type camera, the view range is small. In case of the radio-detector, because of the indirect detection, the high technique is necessary when using and its maintenance is difficult. Further, since it is conducted by a spot detection different from an area detection, it takes much time and it is rather difficult to detect a hole or a groove. Further, it requires high cost. Therefore, a safe, reliable and economical viewer has been desired.

SUMMARY OF THE INVENTION

It is an object of the present invention to provide a viewer, free from the above-mentioned defects and disadvantages, which is capable of operating safely, reliably and easily, and which is compact, simple in construction and economical.

In accordance with an aspect of the present invention, there is provided a viewer including an optical element, which is capable of viewing a certain range of visual field through an opening of a case by means of the optical element, comprising at least two openings formed in the case; and a mirror which is arranged in the case and is capable of being in or out of a visual field including at least the two openings, thereby changing the visual field, wherein the optical element comprises the mirror.

Other and further objects, features and advantages of the present invention will become apparent from the following description of embodiments with reference to the accompanying drawings, in which:

DETAILED DESCRIPTION OF THE PREFERRED EMBODIMENTS

Figure 1:
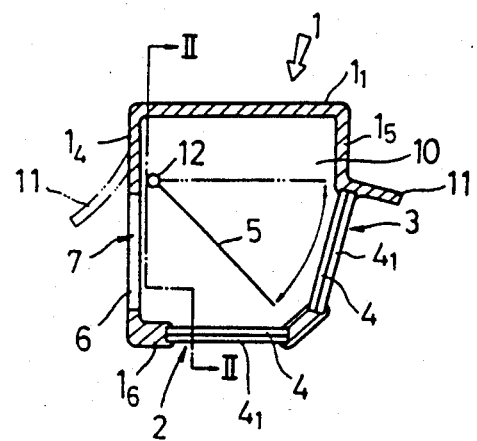
FIG. 1 is a longitudinal cross sectional view of a viewer according to the present invention.

Referring to the drawings, wherein similar or corresponding components are designated by like reference numerals throughout the different figures, there is shown one embodiment of a viewer according to the present invention, which is applied to a loader 14 for repairing a road, in connection with FIGS. 1–6.

Figure 2:
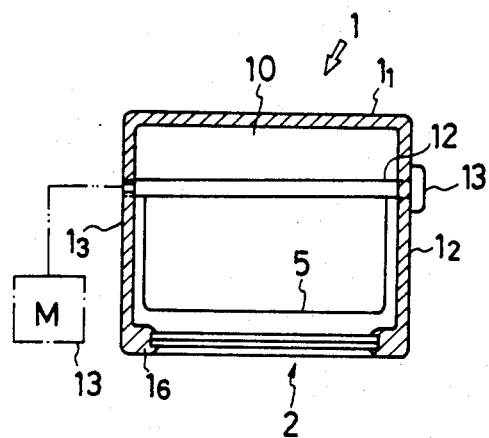
FIG. 2 is a longitudinal cross sectional view, taken along the line II—II of FIG. 1.
Figure 3:
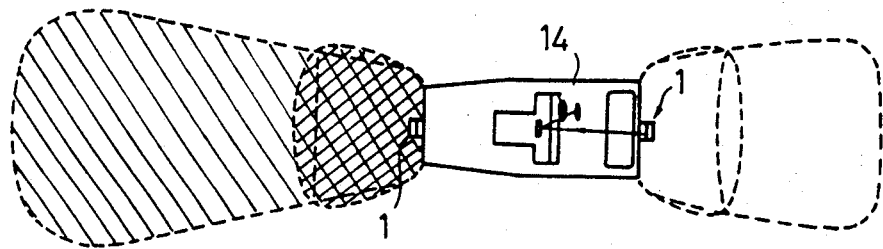
FIG. 3 is a schematic top plan view of a vehicle on which viewers according to the present invention are mounted, for explaining their using state.
Figure 4:
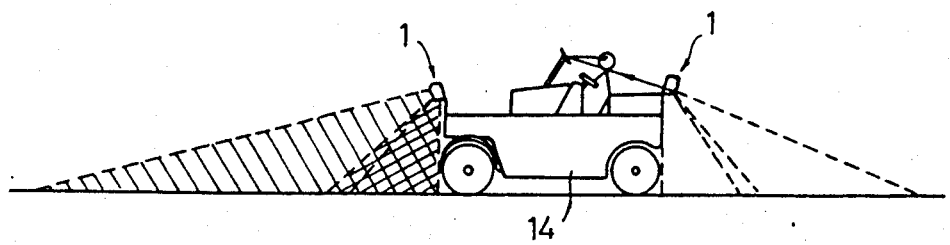
FIG. 4 is a side view of FIG. 3.

In FIGS. 1 and 2, there is shown a viewer according to the present invention, which is capable of observing a dead angle, comprising a case or a box member 1 to be mounted to the loader 14, as shown in FIGS. 3 and 4, and first and second rectangular see-through openings 2 and 3 are formed in the bottom and the rear end of the box member 1. At least one rectangular thin plate-form Fresnel concave lens 4 made of a synthetic resin material is tightly put in the first and the second openings 2 and 3. One or two reflecting mirror or mirrors 5 (only one is shown) are pivotally mounted in an inner space 10 of the box member 1 on and around a pivot shaft 12 which extends horizontally in the upper part close by the front end in parallel therewith so that the reflecting mirror or mirrors 5 may be in or out of a visual field including the first and the second openings 2 and 3. A third rectangular see-through opening 7 comprising a transparent plate 6 tightly put therein is provided in the front end opposite to the rear end having the second opening 3.

Figure 5:
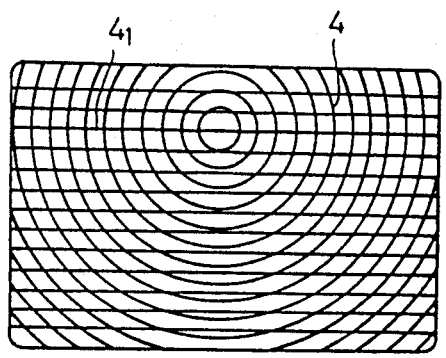
FIG. 5 is an enlarged elevational view of an optical element used in the viewer of FIG. 1.
Figure 6:
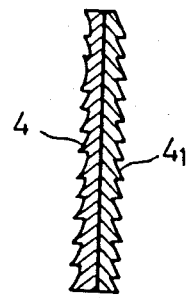
FIG. 6 is a longitudinal cross sectional view of the optical element of FIG. 5.

The box member 1 comprises a flat roof $1_1$ having an sufficient area for providing the mirror 5, a pair of side walls $1_2$ and $1_3$, a pair of front and rear end walls $1_4$ and $1_5$, the former including the wide third opening 7 and the latter including the wide second opening 3, and a bottom $1_6$ including the wide first opening 2. The first and the second openings 2 and 3 and the third opening 7 are sealed hermetically by the thin plate-form Fresnel concave lens 4 made of a synthetic resin material and a transparent plate 6, respectively, The Fresnel concave lens 4 is overlayed tightly one on another by a thin plate-form refractive prism $4_1$ made of a synthetic resin material, as occasion demands, as shown in FIGS. 5 and 6. A pair of refractive prisms $4_1$ may be overlayed over the both surfaces of the Fresnel concave lens 4. The Fresnel concave lens 4 with or without the refractive prism $4_1$ and the reflecting mirror 5 constitute an optical element for the viewer shown in FIGS. 1 and 2.

The reflecting mirror 5 pivotally mounted in the inner space 10 of the box member 1 is capable of intercepting the light through at least one of the first and the second openings 2 and 3 and can be in or out of the visual field including the first and the second openings 2 and 3. When the mirror 5 comes off the visual field, it adapts to be situated along the roof 1₁. The mirror 5 may be formed to be slidable or retractable as well as pivotal.

The mirror 5 is driven automatically by drive means 13 directly or indirectly via a power transfer mechanism, and it also may be driven manually. Further, the mirror 5 may be driven under a remote control.

A pent roof 11 may be attached integrally or detachably on the end walls 1₄ and 1₅ over the third opening 7 and the second opening 3, as occasion demands, in order to protect the optical element comprising the Fresnel concave lens 4 and the refractive prism 4₁, or the like, from attaching rain or snow which drops its optical function.

In FIGS. 3 and 4, the two viewers according to the present invention are mounted to the upper centers of the front and the rear of the loader 14. The images of the front and the rear close to and apart from the loader 14 are passed through the optical elements, i.e. the refrective prisms 4₁ and the Fresnel concave lenses 4 of the cases 1 and then are reflected by the mirrors 5 thereof. Thus, a driver can view a wide range of the front and the rear areas of the loader 14 by operating the pivot angles of the mirrors of the two viewers while he drives the loader 14. On this occasion, the viewers do not obstruct any visual field of the driver.

Figure 7:
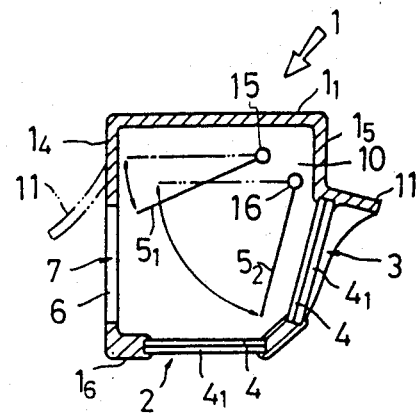
FIG. 7 is a longitudinal cross sectional view of another viewer according to the present invention.
Figure 8:
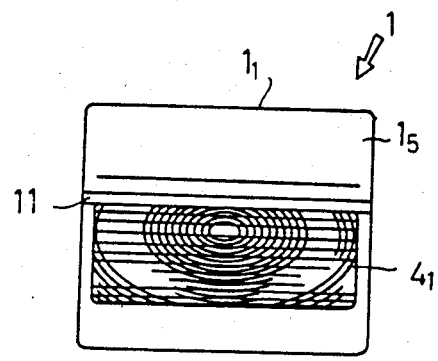
FIG. 8 is an elevational view of the viewer of FIG. 7.

In FIGS. 7 and 8, there is shown another embodiment of the viewer according to the present invention, having a similar construction to that of FIGS. 1 and 2. In this embodiment, a pair of reflecting mirrors 5₁ and 5₂ are pivotally mounted in the inner space 10 of the box member 1 on and around pivot shafts 15 and 16 which extend horizontally in the upper portion near the rear end in parallel therewith in the similar manner to the reflecting mirror 5 of the first embodiment shown in FIGS. 1 and 2. In this case, the two mirrors 5₁ and 5₂ may be driven in cooperation with each other or may be driven independently. An image reflected on the reflecting mirror 5₁ is a rightly upright image observed by a watcher. This type of viewer is employed very conveniently for not only movable machines and apparatus indoors and outdoors but also a variety of uses such as a fixed equipment or machine, a watching of outside from inside, and so forth.

In the above described embodiments, although the openings are formed in the bottom and both ends of the box member 1, however, at most the number of openings corresponding to the number of the surfaces of the box member, for instance, six openings for a hexahedron or a rectangular solid, may be formed in the box member, in combination with the corresponding number of mirrors provided in the box member, thereby being capable of viewing any or a combination of some of the upper, the bottom, the right, the left, the front and the rear directions.

Although the mirror 5 is sealed within the case 1 for preventing from the dust, however, when the viewer is used in a clean place such as an inside of an hospital, it is not necessary to seal the mirror 5 within the case 1, and it can project from the case. In this case, it is sufficient to provide at least two openings, and the transparent plate 6 and/or the Fresnel concave lens 4 can be omitted.

A Fresnel concave lens may be formed partly or entirely over a transparent plastic plate, and a refractive prism may be formed partly or entirely over a transparent plastic plate.

An opaque cover can be pivotally mounted to each opening inside or outside the box member so as to open or close the opening. The unnecessary one of the first and the second openings 2 and 3 is selectively closed by the opaque cover to obtain a clear image. Each opaque cover may be driven in connection with the drive means 13. Such opaque covers are provided so as to avoid causing a dead angle when they are opened.

It is readily understood from the above descriptions that in the viewer according to the present invention the mirror is pivotally mounted to cover a plurality of the openings, and thereby covers a wide range of visual field, and the visual field can be always observed clearly and easily by the optical element comprising a combination of the Fresnel lens with or without the refractive prism, and the mirror. Further, the viewer is compact and simple in construction and can be readily operated as well as little trouble. Further, it is easily and readily mounted to the object such as the machine and the equipment, and there needs no special mounting space nor mounting device, nor reconstruction for mounting. Further, the view range can be varied from the vicinity to the distance without causing a dead angle by pivoting the mirror, and the image can be observed clearly and stably without an error nor a mistake.

Although the present invention has been described with reference to preferred embodiments thereof illustrated in the accompanying drawings, however, various changes and modifications can be made by those skilled in the art without departing from the scope of the present invention.

What is claimed is:

1. A viewer for viewing a certain range of a visual field that is at least partially obstructed, said viewer comprising
   a casing having sides defining a hollow interior,
   at least first and second openings formed on different sides of said casing,
   optical means for altering light, said optical means situated in at least one of said first and second openings, and
   mirror means including at least one mirror, said mirror means situated in said casing interior, at least one mirror of said mirror means being mounted for movement between a first position wherein light entering said casing interior through said first opening directly impinges on and is reflected by said mirror means directly through said second opening, and a second position wherein light entering said casing interior through said first opening is not reflected by said mirror means through said second opening.

2. The viewer of claim 1, wherein said optical means comprise a lens situated in at least one of said first and second openings.

3. The viewer of claim 1, wherein said optical means comprise at least one prism situated in at least one of said first and second openings.

4. The viewer of claim 1, wherein said second position is within said casing interior.

5. The viewer of claim 1, comprising three openings, with said optical means comprising a Fresnel concave lens mounted in two of said three openings and a refractive prism overlying each said Fresnel concave lens,
   with a transparent plate being situated in said third opening.

6. The viewer of claim 1, wherein said optical means comprise a Fresnel concave lens situated in at least one of said first and second openings, and refractive prisms overlying said Fresnel concave lens on both sides thereof.

7. The viewer of claim 1, wherein said optical means comprise a Fresnel concave lens and a refractive prism overlying the same.

8. The viewer of claim 1, wherein said mirror means comprise at least one mirror pivotally mounted within said casing interior for movement between said two positions.

9. The viewer of claim 8, additionally comprising shaft means mounted within said casing interior, and upon which said mirror is pivotally mounted, and
drive means for turning said shaft means, to thereby pivot said mirror.

10. The viewer of claim 1, comprising three openings formed on different sides of said casing.

11. The viewer of claim 10, wherein said optical means are situated in two of said three openings.

12. The viewer of claim 10, wherein one of said three openings is provided in a bottom of said casing and the other two of said three openings are respectively situated in lateral sides of said casing, and said optical means comprise a Fresnel concave lens situated in at least one of said three openings.

13. The viewer of claim 12, wherein said optical means additionally comprise a plate-form prism overlying at least one surface of said Fressel concave lens.

14. The viewer of claim 12, additionally comprising a cover associated with each said opening, for covering the same.

15. The viewer of claim 12, wherein a transparent plate is situated in one of said three openings.

16. The viewer of claim 15, wherein said opening having said Fresnel convave lens is situated opposite said opening having said transparent plate.

17. The viewer of claim 16, wherein said optical means additionally comprise a Fresnel concave lens situated in an opening in the bottom of said casing.

18. The viewer of claim 1, wherin said mirror means comprise two mirrors situated within said casing interior and being mounted for movement therewithin.

19. The viewer of claim 18, wherein each said mirror of said mirror means is pivotally mounted within said casing interior.

20. The viewer of claim 19, additionally comprising two shafts, with each of said mirrors of said mirror means being mounted upon a respective shaft within said casing interior.

* * * * *